W. B. FOX.
BEET LIFTING MECHANISM.
APPLICATION FILED JAN. 16, 1908.
910,467.
Patented Jan. 19, 1909.
2 SHEETS—SHEET 1.
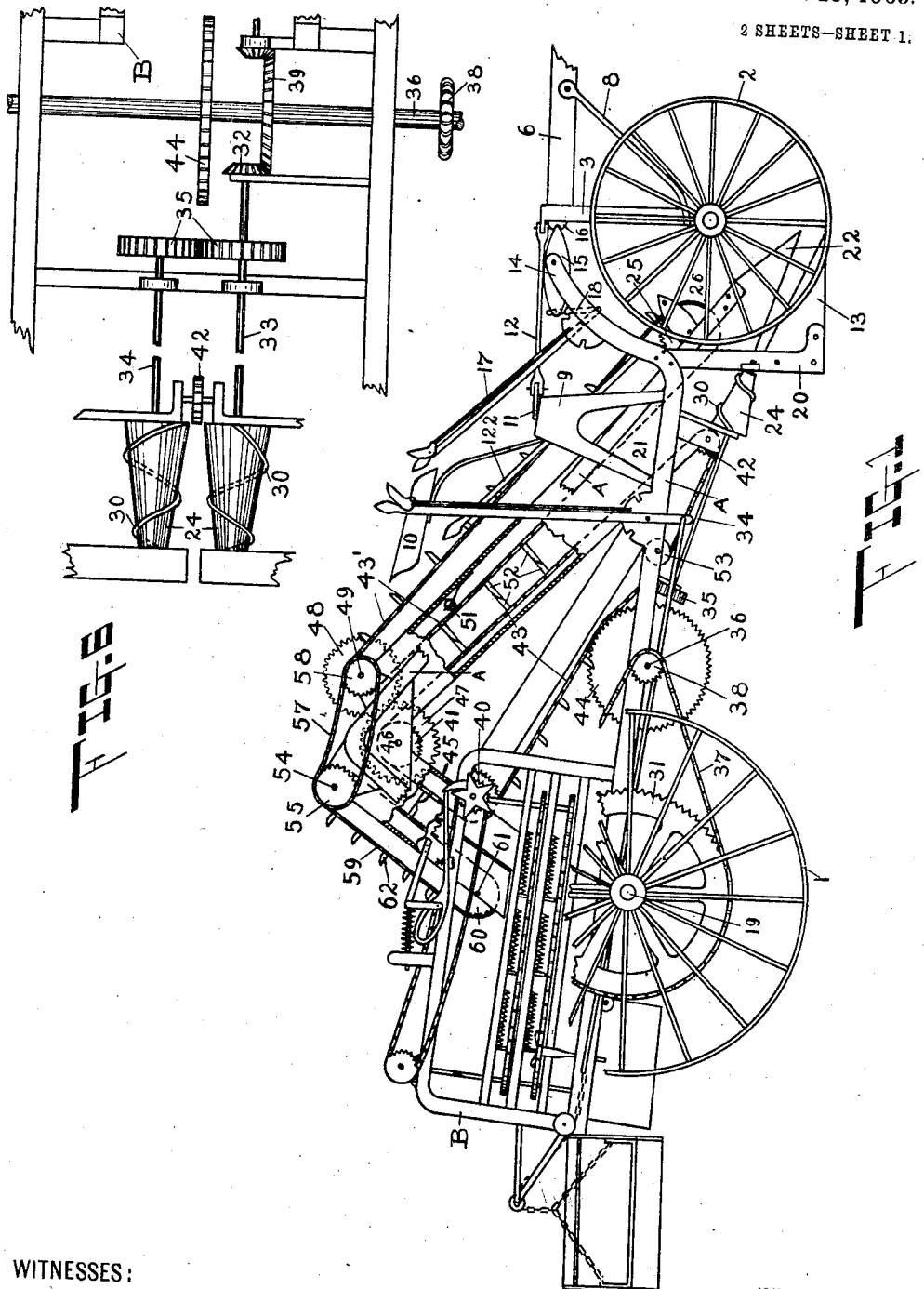
WITNESSES:
J. Ray Abbey
Ralph S. Winfield
INVENTOR
William B. Fox
BY
Geo. B. Willer
ATTORNEY

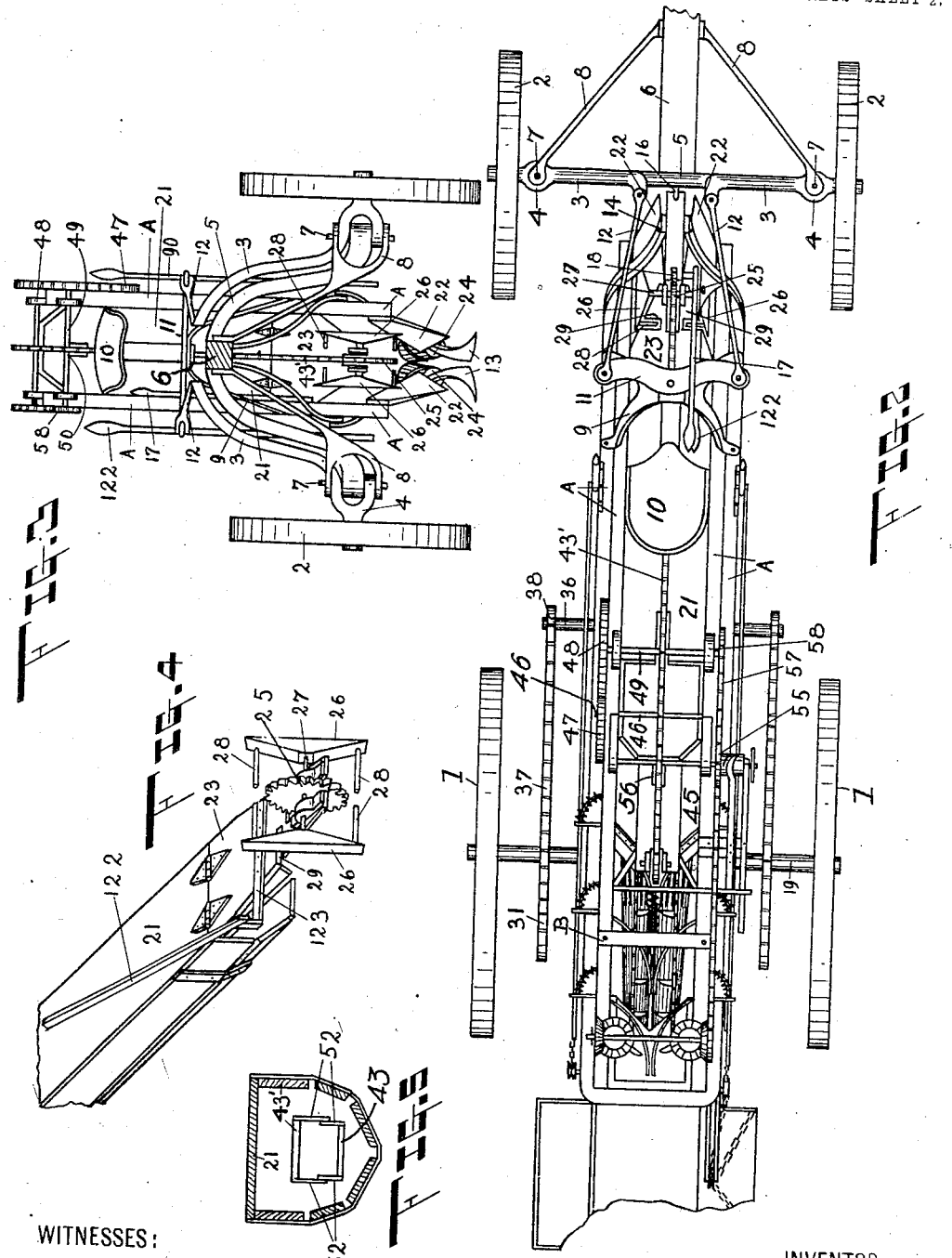

UNITED STATES PATENT OFFICE.

WILLIAM B. FOX, OF BRECKENRIDGE, MICHIGAN.

BEET-LIFTING MECHANISM.

No. 910,467.             Specification of Letters Patent.           Patented Jan. 19, 1909.

Original application filed August 17, 1906, Serial No. 331,001. Divided and this application filed January 16, 1908.
Serial No. 411,139.

*To all whom it may concern:*

Be it known that I, WILLIAM B. FOX, a citizen of the United States, residing at Breckenridge, in the county of Gratiot and State of Michigan, have invented certain new and useful Improvements in Beet-Lifting Mechanism; and I do hereby declare the following to be a full, clear, and exact description of the invention, such as will enable others skilled in the art to which it appertains to make and use the same.

My invention relates to harvesting machines, and more particularly to beet harvesting machines, though it is also capable of use for harvesting other root crops as well.

Manufacturers of beet harvesting machinery have proceeded along divergent lines, one class preferring to "top" the beet prior to pulling it, while the other class utilize the top for pulling the beet, after which the top is removed. In my invention, I depart from both forms, since the top is left on the beet until after it is pulled and yet I do not use the top in pulling the beet. It is not feasible to top the beets prior to pulling, since the top of the roots may be just below or some distance above the ground and an operator must continually adjust the cutter to each beet as he approaches it. Naturally this is impracticable and as a result many beets are either not topped at all or else a large slice of the root itself is removed with the top.

One object of my invention is the provision of means for uprooting the beets from beneath by means of plows.

Another object is the provision of improved means for bunching the tops of the beets.

A further object is the provision of means for causing the beets to fall, tops first, onto the conveyer.

A still further object is the provision of a conveyer capable of handling beets of varying size.

Still another object is the provision of means for raising and lowering the lifting mechanism.

A still further object is the provision of means for automatically retaining the tops in bunched position as they are carried along by the conveyers.

Other objects of my invention will be more fully set forth hereinafter and particularly pointed out in the claims.

In the accompanying drawings, Figure 1 is a view in side elevation of a device equipped with one form of my invention; Fig. 2 is a top plan view thereof; Fig. 3 is a view in front elevation; Fig. 4 is a detail perspective view of the elevating chute; Fig. 5 is a detail cross-sectional view therethrough; and Fig. 6 is a detail plan view showing the means for operating the conical rolls.

This application constitutes a divisional part of an original application filed by me, August 17, 1906, Serial No. 331,001, upon which Letters Patent No. 890,585, were granted June 9, 1908, and reference is made thereto for all description of the topping mechanism.

The drawings merely disclose one of a number of embodiments in which my invention may be incorporated, and referring to such drawings, (A) indicates any suitable framework supported by the rear driving wheels (1) (1) and the front wheels (2) (2). These front wheels are each journaled on the lower ends of the curved arms (3) (3) having a knuckle (4) formed at their lower ends, as shown in Fig. 3, the knuckles adapted to receive the ends of an inverted U-shaped axle (5), to which the rear end of the tongue (6) is secured. Pivot pins (7) (7) pass through the knuckles and the lower ends of the axle (5) to loosely connect the arms and axle and braces (8) (8) extend between the knuckles and the tongue to strengthen and support the latter.

A spider (9) is mounted on the frame (A) near the forward end thereof, a seat (10) being supported by the spider, and to this spider is pivotally secured a foot-bar (11) extending transversely of the frame, the opposite ends of the foot-bar being connected by means of links (12) (12) to the upper ends of the arms (3) (3).

The object of this construction is to enable the operator to guide the machine properly relative to the beet rows, which are generally somewhat crooked even though the beets have been drilled, and it is plainly obvious that unless the machine is made flexible so that it can follow the rows, a large number of beets will be injured by the plows or else will not be gathered. The operator, seated on the seat (10) places his feet on the pivoted foot-bar (11) and can easily and quickly guide the machine so as to bring the successive beets directly between the plows or lifters (13) (13), hereinafter set forth.

It is quite evident that an inoperative machine will result if there is no means for raising and lowering the lifters as when traveling from place to place on the road or upon arriving at the end of a row of beets, the machine, of course, traveling back and forth across the field. In order, therefore, to permit the lifters to be raised above the level of the ground, I preferably form the forward end of the frame into a gooseneck (14) and between the side-bars of the frame at the head of the gooseneck I pivot a rocking lever (15) intermediate its ends, the forward end of the lever being loosely connected in any suitable manner, as by a staple (16), to the rear end of the tongue. A hand lever (17) is pivoted to the frame below the lever (15) and in position to be readily operated by the driver in seat (10), one end of the lever being connected by a link (18) to the rear end of the rocking lever (15). From this, it will be seen that the weight of the forward end of the frame and the parts carried thereby is loosely connected to the rear end of the tongue by means of the staple (16), but when the lifters are in the ground, they will assist in supporting the weight of the frame, relieving the staple of a strain and the staple is strong enough to support the weight when the machine is being transported from place to place or being turned at the end of a row.

In order to lift the forward end of the frame, which is journaled on the rear axle (19), the driver will grasp the lever (17) and force it downward, thereby thrusting upward on the link (18) and locking the rear end of the rocking lever (15) upward to raise the forward end of the frame, which carries the lifters. A reverse movement of the lever (17) lowers the forward end of the frame and lifters, any suitable mechanism being provided to lock the lever (17) and the frame in their adjusted positions. It is evident also that by manipulating this lever, the depth to which the levers will descend when in operation may be regulated.

The lifters (13) are located at the lower ends of standards (20) (20) depending from the frame (A), and such lifters may be of any suitable form; but I preferably provide the pair of lifters shown which incline rearwardly from point to heel and are so positioned that the space between the lifters is constricted from point to heel as well.

The plan of operation of my invention is as follows: The lifters are caused to enter the ground a suitable distance on opposite sides of the rows of beets and as the machine moves forwardly the lifters pass beneath the widest diameter of the roots of the beets and gently raise the roots out of the ground. If the beet sets deep in the ground, the forward portion of the lifters will engage the root and cause the latter to rise vertically out of the soil on account of the increased incline of the lifter. Of course, where the beet sets high, it will not be engaged by the lifter until the points have passed some distance beyond the beet.

Directly behind the lifters are a pair of rolls, onto which the beets fall with their tops extending rearwardly, the tops having been gathered and bunched by suitable means located directly above the lifters. The tendency of the beets is to fall rearwardly, but where a beet is small, or for other causes, it might sometimes fall forwardly, to obviate which, I provide a beater, which thrusts the tops rearwardly insuring that the beet will fall in the right direction.

From the rolls, the beet is conveyed, top foremost, first upwardly and rearwardly and thence downwardly to the topping mechanism, a description of which is embodied in my United States Letters Patent No. 890,585 granted June 9, 1908.

To return to the construction of the machine, the frame supports a chute (21) which extends rearwardly and upwardly from a point just behind the rolls (24), the lower forward end of the chute being open to receive the beets. To the forward end of the top of the chute is hinged a lip (23), the free end of which lip has a sprocket wheel (25) journaled therein, as shown in Fig. 4. A pair of diverging guides (22) (22) are secured to the frame at a point just above the lifters (13) (13), the guides being inclined rearwardly, their lower forward ends or points lying just at the surface of the ground, whereby to catch and embrace all the leaves of the top which often spread over the ground in all directions, the leaves being gradually straightened and bunched as the machine moves forwardly. The forward open end of the chute lies some distance behind the guides, the hinged lip (23) projecting in advance of the chute and lying above the rear ends of the guides (22) (22). The forward end of the lip is reduced, as shown, to provide space for the rotary beaters (26) (26) carried on the ends of the shaft (27) of the sprocket (25). The beaters may preferably consist of members located at opposite ends of the shaft (27) and extending transversely relative thereto, the members each having transversely projecting pins (28) (28) extending parallel with the shaft (27), as shown in Fig. 4, and the lip is recessed, as at (29), to permit the pins to pass therethrough. The hinged lip and beaters are adjustable to different heights of tops by means of the lever (122) to which the lip is connected by means of a link (123).

With the possible exception of the cover, which may be solid, as shown, the bottom and sides of chute (21) are formed of slats spaced apart from each other, as shown in Figs. 4 and 5, to permit any soil adhering to the beets to drop through the chute as the beets are conveyed therethrough.

Just below the hinged lip (23) are the conical rolls (24) (24), the space between which being constructed as shown in Fig. 6, the rolls being set at an incline to the horizontal and having the spiral ribs (30) (30) extending peripherally thereon. These rolls form a continuation of the incline of the lifters, the points of the rolls lying adjacent the heels of the lifters and the space between the rolls is designed to permit the dirt and stones raised by the lifters with the beet, to be dropped back onto the ground, without passing through the machine.

The rear axle carries the drive gears (31) (31) which communicate motion to a counter shaft (36) by means of sprocket chains (37) passing over the gears (31) (31) and over the sprockets (38) on the countershaft, which in turn carries a bevel gear (39) meshing with a bevel-gear (32) on shaft (33), the shaft (33) being suitably journaled in the frame beneath the conveyer chute, and having one of the conical rolls (24) secured thereon at its forward end. A shaft (34) suitably journaled in the frame carries the other conical roll (24), shafts (33) and (34) bearing the intermeshing gears (35), whereby the rolls are caused to rotate toward each other.

I am aware that heretofore conical rolls with spiral grooves have been used, but the ribs project above the surfaces of the rolls and actually engage and force the beet upward along the rolls, whereas the grooves lack this function and furthermore lose whatever utility they may possess by becoming filled with clay and soil.

The sprockets (40) (41) and (42) occupying a triangular relation to each other and journaled in the frame are adapted to support the lower of the drive or conveyer chains (43), sprocket (41) being located at the apex of the frame, such chain (43) passing over a gear-wheel (44) on countershaft (36) from which it derives its motion, the chain passing upward through the slotted conveyer chute (21) and over sprocket (41), after which the chain passes down through a tripping chute (45) and thence around sprocket (40), over gear (44) and around sprocket (42), the latter being located at the forward end of the machine at the mouth of chute (21). The sprocket (41) is carried by a shaft (46), on which is secured a gear (47) meshing with a gear (48) on shaft (49) located above the upper end of chute (21), the shaft (49) carrying a sprocket (50), around which passes the remaining chain (43') of the conveyer, chain (43') passing downward outside the chute (21) and over sprocket (25) on the hinged lip (23) and thence upward through chute (21), a pressure roller (51) within the chute bearing on the chain (43') to hold it down. These conveyer chains are each arranged to travel together and are provided each with a series of fingers (52) (52), the fingers on the upper chain (43') adapted to take over or embrace the fingers on the lower chain, in the manner shown in Figs. 1 and 5. The lower chain (43) is also engaged by a tightening sprocket (53) to cause it to positively engage the teeth of the gear (44). The fingers project from the opposite sides of the chains (43) (43') so as to avoid contact with the sprockets over which the chains pass, and it is the function of the pressure roller (51) to hold the fingers in the telescoped position, shown in Fig. 5. The operation of this part of my invention is as follows: The beets having been raised out of the ground, by the lifters (13) (13) and having their tops bunched during such lifting process by the bunching guides (22) (22) are engaged by the beaters (26) which by contact with the bunched tops operate to throw the tops rearwardly, the roots being supported by the conical rolls (24) (24). It will be observed that the beaters and sprocket wheel (25) are located above and in advance of the sprocket (42), which is situated just in the rear of the rolls (24), so that the bunched tops are engaged and held in constricted position by the fingers (52) before they leave the bunching guides (22), the rear ends of which are located beneath the sprocket (25). When the root engages the roll (24), it is caught by the peripheral spiral ribs (30) and forced rearwardly, the bunched tops extending toward the rear of the machine and being confined by the fingers (52) of the upper chain (43'). As the fingers of the upper chain reach the rear ends of the rolls a set of fingers on the lower chain arrive and mesh between the fingers of the upper chain, the root being transferred from the rolls (24) to the chains between which it lies and by which is it gripped and carried up the chute (21) and down into the tripping chute (45). The upper chain (43') leaves the beet at the upper end of the inclined chute (21), but the lower chain continues on through the down chute (45). A shaft (54) is journaled at the upper end of the down-chute, said shaft carrying a gear (55) and a sprocket (56), a drive-chain (57) passing over gear (55) and over a second gear (58) on shaft (49), whereby motion is imparted to an upper drive chain (59) passing around sprocket (56) and a sprocket (60) on shaft (61) carried at the lower end of the cover of the down-chute (45). The chain (59) is provided with fingers (62) telescoping over the fingers (52) of the chain (43), as before described, the chains (43) (43') and chain (59) all running together and constituting a conveyer for the roots and tops. The upper open ends of chutes (21) and (45) lie adjacent each other, as shown in Fig. 2, the lower end of the chute (45) discharging the beets, tops first, into a topping conveyer, shown in Figs. 1 and 2.

In those machines which top the beet prior to harvesting, the cutter may take the leaves off several inches above the roots or will cut a portion of the root off with the tops and when the roots are subsequently plowed up, a large amount of the crop will be covered by the loose earth plowed up, and lost. This method of harvesting the beets possesses other disadvantages as well. In those machines which grasp the top of the beet and pull it, the beets subsequently being conveyed by the gripping chains to a cutter, the same disadvantages first mentioned arise, namely, that the cutter will leave some inches of top on one beet while the next will be cut in two through the root.

Having thus fully disclosed my invention, what I claim as new is—

1. A beet harvester comprising a frame, inclined lifters carried by the frame, bunching guides located above the lifters, rotatable rolls located rearwardly of the lifters, spiral ribs on the rolls, and conveyer mechanism for receiving beets from the rolls.

2. A beet harvester comprising a frame, inclined lifters carried by the frame, conveying mechanism, rolls located between the lifters and conveying mechanism, bunching guides located above the lifters, and a rotary beater for engaging the tops and forcing them rearwardly.

3. A beet harvester comprising a frame, inclined lifters carried by the frame, conveying mechanism, rolls located between the lifters and conveying mechanism, bunching guides located above the lifters, and a rotary beater driven by the conveying mechanism for engaging the tops and forcing them rearwardly.

4. A beet harvester comprising a frame, inclined lifters carried by the frame, conveying mechanism, rolls located between the lifters and conveying mechanism, a rotary beater driven by the conveying mechanism, and means for adjusting the beater.

5. A beet harvester comprising lifters, conveying mechanism leading from the lifters, rolls interposed between the lifters and conveying mechanism, and bunching guides located above the lifters.

6. A beet harvester comprising lifters, conveying mechanism, rolls located between the lifters and conveying mechanism, a hinged lip, a rotary beater journaled on the lip, and means for adjusting the lip.

7. A beet harvester comprising lifters, rolls on which the material from the lifters is received, means for bunching the tops, an adjustable lip, a shaft carried by the lip, beaters mounted on the shaft and above the bunching means, and conveying mechanism for receiving the beets.

8. A beet harvester comprising lifters, rolls on which the material from the lifters is received, means for bunching the tops, an adjustable lip, a shaft carried by the lip, beaters mounted on the shaft and above the bunching means, the lip being slotted to give clearance to the beaters, and conveying mechanism for receiving the beets.

In testimony whereof, I affix my signature in presence of two witnesses.

WILLIAM B. FOX.

Witnesses:
GEO. W. TORBERT,
CLARENCE K. FOX.